Feb. 14, 1939.  C. BEUSCH  2,147,082
DEVICE FOR BRAKING VEHICLES
Filed July 30, 1935  2 Sheets-Sheet 1
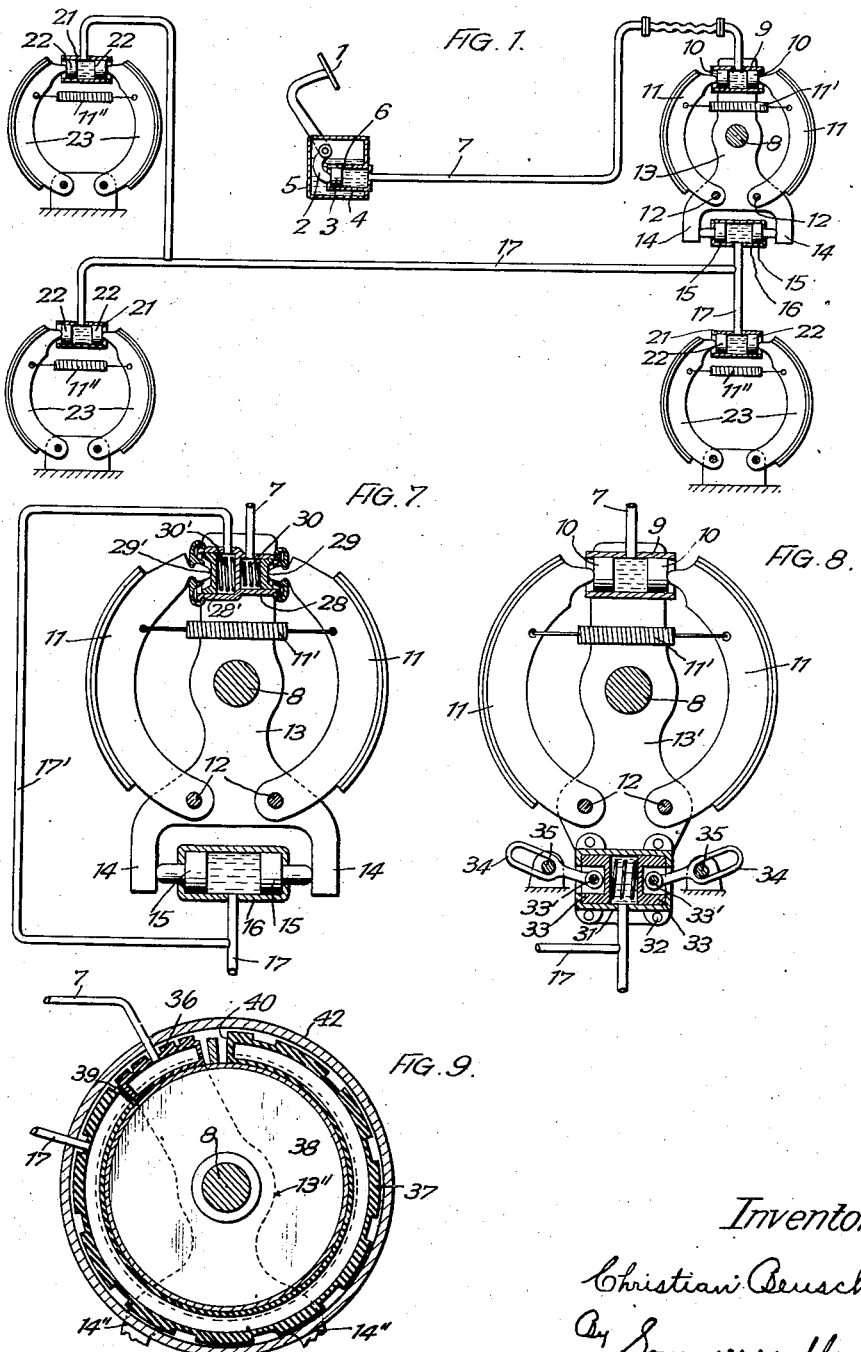
Inventor:
Christian Beusch
By Sommers & Young
attys.

Feb. 14, 1939.　　　C. BEUSCH　　　2,147,082
DEVICE FOR BRAKING VEHICLES
Filed July 30, 1935　　　2 Sheets-Sheet 2
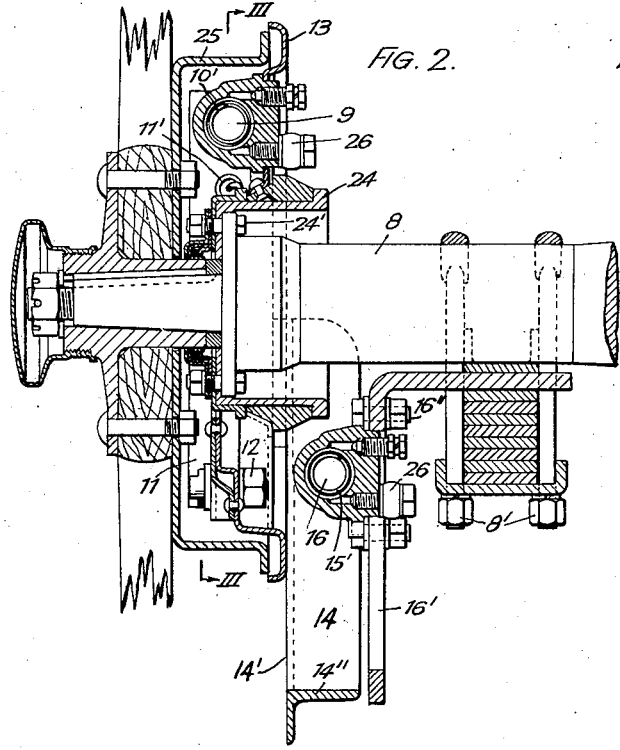
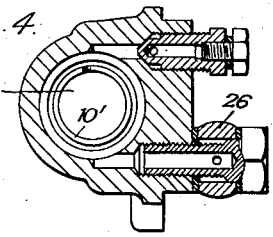
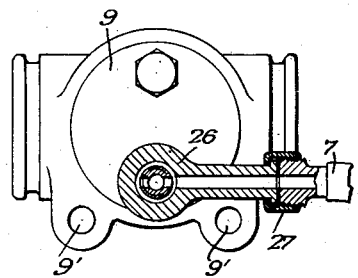
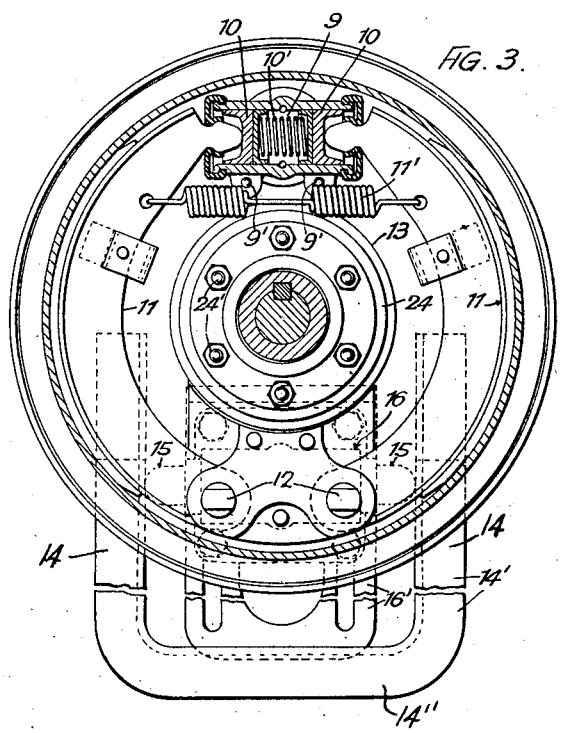
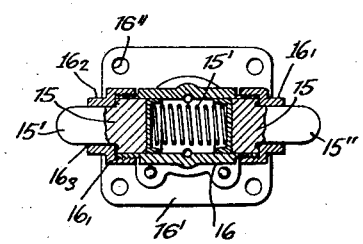
Inventor:
Christian Beusch
By Sommers & Young
Attys.

UNITED STATES PATENT OFFICE 2,147,082

DEVICE FOR BRAKING VEHICLES

Christian Beusch, Wadenswil, Switzerland, assignor to Corporation of Beusch-Bremsen-Aktiengesellschaft, Zurich, Switzerland Application July 30, 1935, Serial No. 33,906
In Switzerland May 9, 1935

11 Claims. (Cl. 188—152)

This invention relates to methods of and devices for braking vehicles.

Owing to the high speeds at which vehicles, particularly power vehicles, are driven now-a-days, it has become common practice among the drivers of such vehicles to avoid applying the brakes suddenly, as in this way the wheels are locked and thus danger exists of the vehicle skidding. Furthermore, by this means the vehicle gets out of control of the driver and the braking effect of the locked wheels is less than that of rotating wheels. Another rule of driving for the purpose of reducing or practically eliminating skidding consists in providing for braking all the wheels at a perfectly uniform rate by adjusting the brakes accurately.

The present invention distinguishes from the measures hitherto used by departing from the last-mentioned rule and allowing the driver to apply the brakes suddenly to a considerable degree with any condition of the surface of the roadway, inclusive of dangerous moist asphalt surfaces, without inviting skidding of the vehicle, as extensive tests have proven.

By means of the method according to the present invention the brake of one vehicle wheel, preferably a rear wheel, is caused to operate directly and, the brakes of other wheels are influenced by the operation of the brake of the said first wheel. By the braking effort applied to the first wheel this wheel is locked, while its influence on the brakes of the other wheels is so correlated that these wheels are prevented from becoming locked under any conditions. Therefore, the driver cannot lock all the wheels or more than one wheel, so that skidding is absolutely avoided. At the same time the vehicle with only one wheel locked remains under control of the driver and, as tests have shown, a stopping of the vehicle can be effected in a shorter time than normally required.

During locking the first wheel, the braking pressure building up at the other wheels is dependent on the torque effected by the adhesion due to friction between the first wheel and the roadway. In the event that the roadway is moist, the first wheel is locked but the resulting torque is then relatively small and the brakes of the other wheels are not operated to such a degree that these wheels become locked. If the roadway is dry, the adhesion due to friction and thus also the resulting torque is correspondingly larger. As, however, in this case locking the wheels requires a considerably greater braking effort, the other wheels are not locked either.

A further feature of this invention comprises manually applying part of the force necessary for braking the primary or controlling wheel through a primary braking system and applying the remainder of the braking force to the primary wheel by the secondary braking system. The braking of the controlling wheel is, therefore, partially dependent on the braking pressure in the secondary system. Thus, only part of the braking force applied to the controlling wheel is independent of the secondary system. The independently variable force is therefore proportionately smaller than if the secondary system did not affect the controlling wheel, and in this way the braking forces and effects of the primary and secondary systems are kept more nearly equal while at the same time the secondary system is kept under the control of the primary system and the secondary braking forces are always less than the primary braking force.

The application of a braking effort from the driver's seat to the first wheel and from this to the other wheels can be effected in any suitable way, for example, hydraulically.

In the accompanying drawings several embodiments of the invention are illustrated by way of example only, in which Fig. 1 shows a schematic lay-out of a first embodiment;

Fig. 2 shows a larger scale vertical section through the axle of a first vehicle wheel;

Fig. 3 represents a section on the line III—III in Fig. 2;

Fig. 4 is a sectional view of the master cylinder of Fig. 2 on a still larger scale;

Fig. 5 shows a sectional elevation of Fig. 4, as seen from the right in the latter;

Fig. 6 shows a section through a detail of Fig. 3;

Fig. 7 is a schematic view partly in section of a second embodiment of the invention;

Fig. 8 is view similar to Fig. 7 of a third embodiment of the invention, and

Fig. 9 is a schematic sectional view of a fourth embodiment of the invention.

By numeral 1 the braking pedal at the seat of the driver of the vehicle is designated, which pedal permits actuation, by means of a lever arm 2, of a plunger 3 which is displaceably arranged in a cylinder 4. This cylinder extends into a liquid container 5 and is provided with a port 6 through which liquid, for example oil, can pass from the container 5 into the cylinder 4. The cylinder 4 is connected with a cylinder 9 through a liquid supply pressure conduit 7 having a flexible portion 7', two plungers 10 being reciprocable in the latter cylinder and adapted to actuate two brake jaws or shoes 11, the one ends of which are maintained in bearing contact with the plungers 10 by a tension spring 11', while the plungers are maintained in spaced relation by an intervening compression spring 10', Fig. 3. These brake jaws are rockably mounted, by means of pivots 12, on a support or frame 13 which in turn is mounted for free rocking movement about the axle 8 of a first vehicle wheel. The cylinder 9 is also mounted on this support 13, and movement of the cylinder together with its support is permitted by flexure of the flexible section 7' of conduit 7. The support 13 is provided with two arms 14 each of which cooperates with a plunger 15. Plungers 15 are inserted from opposite ends in a cylinder 16 which is carried by an angular bracket 16' of a fixed part of the vehicle frame (Fig. 2) and which communicates with a pressure liquid carrying conduit system 17. The conduit system 17 connects the cylinder 16 with cylinders 21 of the usual braking arrangement of the other vehicle wheels. These cylinders 21, as shown, have plungers 22 cooperating with brake jaws or shoes 23 that are interconnected by springs 11'', the plungers being reciprocable in the cylinders 21 in known manner.

From the constructional Figs. 2 and 3, it will be seen that the two arms 14 previously referred to of the support 13 which arms cooperate with the plungers 15 of the cylinder 16 are provided by a stirrup 14', Fig. 3 which is rigid with the body of the support 13. The lower ends of arms 14 may be connected by a crossbar 14'' in order to complete the frame 14' and render the arms more rigid. The cylinder 16 is supported by the bracket 16', Fig. 2 by means of bolts 16'', the bracket in turn being fixed to the axle 8 by means of bolts 8'. From Fig. 6 it is evident that the plungers 15 are yieldingly pressed apart inside the cylinder 16 by an intervening compression spring 15'. The outward movement of the plungers is limited by the caps $16_1$ screwed on the ends of cylinder 16. The caps $16_1$ are provided with reduced end portions providing abutment shoulders $16_2$ against which the plungers 15 engage when at their outermost positions, and also are provided with openings $16_3$ through which reduced portions 15'' of the plungers 15 extend for actuation by arms 14. The rockable mounting of the frame or support 13 relative to the axle 8 is provided by the periphery of a drum 24, Fig. 2, surrounding the axle and connected thereto at 24'. The brake jaws 11 which cooperate with the inner circumference of a brake drum 25, Fig. 2 are pivotally connected to the support 13 by means of bolts 12 and the cylinder 9 which is also bolted to the support 13, at 9', connects with the liquid supply conduit 7 by means of a pivotal pipe stud 26 and a pipe coupling 27 (Figs. 4 and 5).

The operation of the device described is as follows:

On depressing the pedal 1, the brake jaws 11 of one of the rear wheels of the vehicle are actuated by hydraulic power transmission by the liquid in the conduit 7 being put under pressure in consequence of which the plungers 10 are moved apart forcing the brake shoes 11 into braking engagement with the drum 24 against the action of their resetting spring 11'. During the application of a braking effort to this first vehicle wheel in this way, a rocking movement of the brake jaws 11 together with the support 13 about the wheel axle is obtained in one or the other direction of rotation depending on the direction of movement of the vehicle. Incidental thereto one or the other of the two arms 14 acts on the correlated plunger 15, thereby exerting pressure on the liquid in the cylinder 16 which pressure is transmitted through the conduit system 17 to the brake cylinders 21 of the other wheels, so that all the pairs of brake jaws 23 of these wheels are applied, in a similar manner as explained for cylinder 9 against the action of the respective resetting springs 11''.

Provided that the pedal 1 is depressed to maximum braking effort, the brake jaws 11 of the first wheel can be applied so vigorously that this wheel will be locked. The degree of the pressure in the cylinder 16 and thus also the operating pressure of the brake shoes 23 of the other wheels is then dependent on the adhesion arising by friction between the first wheel and the roadway, and it is so adjusted by the relative size of the various pistons or plungers that this value is never high enough for locking the other wheels. This is accomplished by proper proportioning of several factors involved. It is obvious that the force derived from the first wheel when locked is equal and opposite to the force that is necessary to be applied to lock the wheel. In order to ensure that the other wheels shall not be locked the force transmission mechanism by which the force derived from the first wheel is transmitted to the other wheels must be so designed that the force applied to each wheel shall be less than that derived from the first wheel when locked. In the embodiment illustrated diagrammatically in Fig. 1 of the drawings, the factors to be taken with consideration are the ratio of the areas of pistons 10 and 15, the ratio of the areas of pistons 15 and 22, the lever arms 8—10, and the lever arm 8—15. The number of operative relationships that could exist is practically infinite and any person skilled in the art could readily determine many suitable relationships of these factors. In order to make this relationship more apparent in the drawings the cylinders 21 and pistons 22, by which braking force is applied to the brake shoes 23 of the other wheels are illustrated as being considerably smaller in diameter than pistons 15 and cylinder 16 and pistons 10 and cylinder 9. However, it is to be understood that with appropriate variation of the lever arm factors involved the relationship sizes of the various cylinders and pistons could be considerably different from that illustrated. In this way the vehicle is absolutely prevented from skidding even if the roadway is moist. Furthermore, the thrust to be applied to the pedal 1 only amounts to ¼ of that which would be necessary for braking all the wheels directly.

This thrust to be exerted by the foot of the driver for braking the first vehicle wheel may be still further decreased, for example, through the intermediary of a servo-motor mechanism. In Fig. 7 a construction of this kind is schematically illustrated which is intended to take the place of the braking arrangement as shown in Fig. 1 for the first vehicle wheel. In this modified primary braking arrangement the cylinder 28 fixed to the upper part of the support 13, instead of being provided with a through-bore, is subdivided by a partition wall into two individual cylinders 28 and 28' each of which includes a separate plunger 29 and 29' respectively, compression springs 30 and 30' being interposed between the partition wall and the plungers for urging the corresponding plungers 29 and 29' outwards in the cylinders into bearing engagement with the outer ends of the brake jaws 11. The lower part of the support 13 may be similar to that disclosed in Figs. 1–6, inclusive, the two arms 14 of this support cooperating with either of the two plungers 15 of a cylinder 16 the same as explained before. However, cylinder 16 communicates with cylinder 29' through a branch conduit 17'. Pressure fluid is supplied to the cylinder 29 from the container 5 through conduit 7 when the driver depresses the pedal 1, so that plunger 29 is advanced to force the correlated brake jaw or shoe 11 into braking engagement with a brake drum, not shown. In consequence of the support 13 rocking and actuating one of the plungers 15 pressure is set up in the pipe system 17 inclusive of the branch conduit 17'. Thus, the brake jaw 11 cooperating with the plunger 29' of the primary braking arrangement for the first or controlling wheel is moved into braking engagement incidental to the operation of the secondary braking arrangements for the other vehicle wheels, in which way the braking effort to be applied by the driver is supplemented and the thrust otherwise necessary to be exerted on the pedal is correspondingly reduced.

A known defect of present brake systems is that the friction coefficient between the brake band and brake drum varies, either through the action of temperature, age or atmospheric conditions (rain, etc.), and the result is that with equal brake application the vehicle is not braked equally. The variation of the friction coefficients is particularly disadvantageous where the brake action depends constantly thereon. These harmful properties are greatly diminished by the embodiment of this invention represented by Fig. 7 in that the primary braking in the first wheel depends partly on the oil pressure of the second system.

Assume, for example, that for some reason the brake bands have a low friction coefficient, then it will require greater application pressure in order to effect a desired braking action. Thus, in order to brake the first wheel for a desired degree, there must be a more powerful application pressure of the brake shoes. As the shoes of the first wheel depend on the pressure in the secondary line there must be a greater pressure present in the secondary line which, in turn, acts on the other brakes so that each brake jaw is more strongly applied. This provides an automatic compensation and equalization with respect to the variable properties of the brake bands.

In Fig. 8 a further modification of the primary braking arrangement is schematically illustrated. In this arrangement the lower part of the support 13' is enlarged so as to be adapted to connect with the secondary master braking cylinder 31, this cylinder being screwed to the enlarged portion of the support, at 32. The plungers 33 of the cylinder 31 which are normally maintained in spaced relation, similarly as all pairs of coacting plungers throughout all the devices illustrated, by means of an intervening compression spring, are each pivoted to slotted control links 34, at 33'. The control slot of each of these links is engaged by a guide bolt 35 which is fixed on the vehicle frame, as indicated. The ends of cylinder 31 are turned inwardly thereby providing abutments which limit the outward movement of the plungers 33. On pressure fluid being supplied to cylinder 9 rigid with the upper part of the support 13' and the latter rocking in one or the other direction of rotation, as explained before, the cylinder 31 is carried in the direction of movement of the lower part of support 13' and the plunger 33 which leads the other plunger, as regards the direction of rocking movement of this support, is forced inwards in the cylinder 31 by the inner end wall of its control slot bearing on the corresponding guide bolt. In this way pressure is built up in the cylinder 31 between the two plungers 33, while the control link of the lagging plunger drags behind idly by shifting relative to the other guide bolt 35.

Still another modification of the primary braking arrangement may be derived by applying the invention to a wheel braking arrangement type as schematically indicated in Fig. 9. The hollow elastic tubes 36 and 37 are closed at their ends and connected to a support 13" and to a brake disc 38 respectively, so as to extend in the circumferential direction of said disc. The exterior circumferential portions of the tubes cooperate, in a known manner, with the inner periphery of a concentric brake drum 42 of a first and controlling vehicle wheel on the axle 8. The shorter tube 36 communicates with the pressure liquid supply of the primary system master cylinder and the longer tube 37 with the secondary liquid carrying conduit system 17 which connects with the braking motors of the other wheels. On the brake pedal 1 being depressed, the tube 36 is expanded by liquid flowing thereto through conduit 7 and is thus caused to frictionally engage with the brake drum. The support 13" is then rocked in one or the other direction of rotation, as previously explained, and thereby urged on the respective closed end 39 or 40 of the tube 37. In consequence thereof, the tube 37 bulges up accordingly at its outer circumference, thereby building up interior liquid pressure and entering into frictional engagement with the inner circumference of the brake drum also, so that the first wheel is locked by action of this primary braking arrangement. The pressure having built up in the liquid contained in the tube 37 is transmitted through the conduit system 17 to the secondary braking arrangements of similar nature of the other wheels, thus braking the same also. On releasing the brake pedal, contraction of all the shorter and longer tubes of all the braking arrangements of the device takes place.

According to the invention provision is made for all brake members of the device to be restored automatically into initial position by the action of springs 11', 11", or the resilience of the tubes 36 and 37 in Fig. 9, also the displacement of the elements of the primary braking arrangement being rectified in automatic manner upon release of the manual braking force.

I do not limit myself to the particular size, shape, number or arrangement of parts as shown and described, all of which may be varied without going beyond the scope of my invention as shown, described and claimed.

What I claim is:

1. Braking mechanism for multi-wheeled vehicles having front wheels and rear wheels, comprising means for applying a primary manual braking effort to only one rear wheel of the vehicle of a magnitude sufficient to lock said one wheel, means for deriving an effort from the torque resulting from said primary braking effort, and means for applying part of said derived effort to each of the other wheels of the vehicle, the braking effort applied to each of the other wheels being less than that required to lock said other wheels.

2. Apparatus for braking multi-wheeled vehicles, comprising a primary braking system operable from the driver's position correlated to a single vehicle wheel, said system having a rockable frame mounted on the wheel axle, braking elements mounted on said frame to rock therewith about the axis of said wheel when braking said wheel, a secondary braking system correlated to other wheels of the vehicle, and power transmission means operatively connecting said primary and said secondary braking arrangements to transmit force produced by the braking effect of the primary system to said secondary braking system to brake the other wheels, each with a smaller braking force than that applied to said single wheel.

3. Apparatus for braking multi-wheeled vehicles comprising a manually operable primary brake applying system, and a secondary brake applying system, said primary system including a frame mounted to rock about the axis of one wheel, a brake shoe pivoted on said frame and rockable therewith, said frame being rocked by the braking effect of said wheel when said shoe is operative to brake said wheel, means operated by the rocking of said frame for actuating the secondary system, said secondary system including a brake shoe in said one wheel, a double ended cylinder mounted on said frame having an intermediate division wall, said cylinder being connected on one side of said wall with the primary system, said side of said piston having a plunger therein connected to the first mentioned brake shoe, said cylinder being connected on the other side of the partition to the secondary system, said other side of said cylinder having a plunger operatively connected with said second mentioned brake shoe.

4. Apparatus for braking wheeled vehicles comprising a primary system and a secondary system, a cylinder divided intermediately by a partition, a plunger in each end of said cylinder, a pair of brake shoes each connected with one of said plungers to be actuated thereby, one side of said cylinder being connected with the primary system, and the other side being connected with the secondary system, and means for converting the braking effect of the primary system into a force and applying said force to actuation of the secondary system.

5. In mechanism for braking multi-wheeled vehicles, a pair of brake applying elements associated with each wheel comprising, means for manually actuating one of the brake applying elements of only a single wheel, means for deriving a force from the resulting braking effect of said single wheel, and means for using said derived force for actuating the other brake applying element of said single wheel and the brake applying elements of the other wheels.

6. Mechanism for braking multi-wheeled vehicles comprising means for manually applying a braking effort to only a single wheel of the vehicle, means for deriving a force from the braking effect of said manually applied braking force, means for applying a part of the derived force to brake the said single wheel and each of the other wheels.

7. Mechanism for braking multi-wheeled vehicles comprising means for manually applying a braking effort to a single wheel of the vehicle, means for deriving a force from the braking effect of said manually applied braking force, means for applying a part of the derived force to brake the said single wheel and each of the other wheels, the total braking force applied to the single wheel being greater than that applied to any of the other wheels.

8. Mechanism for braking multi-wheeled vehicles comprising means for manually applying a braking effort to a single wheel of the vehicle, means for deriving a force from the braking effect of said manually applied braking force, means for applying a part of the derived force to brake the said single wheel and the remainder of said derived force equally to each of the other wheels, the total braking force applied to the single wheel being greater than that applied to any of the other wheels, the braking force applied to said other wheels being at all times less than sufficient to lock the said single wheel.

9. Apparatus for braking vehicles having at least four wheels, braking means on each of said wheels, mechanism for applying a manually originating braking force to only one of said wheels, means for deriving a force from the braking effect of said one wheel and means for dividing said derived force into partial forces, and means for applying one of said partial forces to each of the other three wheels, said partial forces each being less than required to lock the wheel to which it is applied, whereby when the vehicle is braked said other three wheels are prevented from locking and maintain rolling contact with the roadway so that the direction of travel of the vehicle is controlled by said other three wheels.

10. Apparatus for braking vehicles having front and rear axles provided with wheels, comprising a primary braking system operable from the driver's position correlated to a single rear vehicle wheel, said primary system including a frame mounted to rock on the rear axle, a pair of braking shoes pivoted at one end thereof on said frame within said rear wheel, a braking cylinder mounted on said frame intercalated between the ends of said braking shoes opposite the pivots thereof, said cylinder having pistons therein engaging the adjacent ends of said shoes, a secondary braking system including a master cylinder having a pair of pistons engaged by portions of the said frame of the primary system, said secondary system including fluid actuated braking elements in the other wheels of the vehicle, and power transmission means operatively connecting said master cylinder with said secondary braking elements to transmit force produced by the braking effect of the primary system to said secondary system braking elements, said secondary braking elements applying less braking effort to said other wheels than is applied to the first wheel by the primary braking system, whereby locking of the other wheels is avoided and skidding of the vehicle prevented.

11. In mechanism for braking multi-wheeled vehicles, a pair of brake-applying elements associated with one of the wheels of the vehicle, brake-applying elements associated with the other wheels, means for manually actuating only one of the brake-applying elements of said one vehicle wheel, means for deriving a force from the resulting braking effect of said one brake-applying element of said one wheel, and means for using said derived force for actuating the other brake-applying elements.

CHRISTIAN BEUSCH.